United States Patent [19]

DeSousa et al.

[11] Patent Number: 4,637,873
[45] Date of Patent: Jan. 20, 1987

[54] FRONT LOAD SKIMMER/FILTER FOR SPAS AND POOLS

[75] Inventors: Daniel A. DeSousa, Clayton; Gary L. Gockel, Martinez; Ralph D'Innocente, Walnut Creek; Roy A. Jacuzzi, Moraga, all of Calif.

[73] Assignee: Jacuzzi Inc., Little Rock, Ark.

[21] Appl. No.: 815,501

[22] Filed: Dec. 16, 1985

[51] Int. Cl.[4] .......................... E04H 3/20; C02F 1/00
[52] U.S. Cl. .................................... 210/169; 210/196; 210/232; 210/238; 210/242.1; 210/416.2; 4/507; 4/542
[58] Field of Search .................. 4/507, 542, 543, 544; 210/805, 167, 169, 196, 232, 238, 251, 416.1, 416.2, 314, 316, 320, 242.1

[56] References Cited

U.S. PATENT DOCUMENTS

| | | | |
|---|---|---|---|
| 2,900,079 | 8/1959 | Pace | 210/416.2 |
| 3,067,879 | 12/1962 | Baker | 210/416.2 |
| 3,168,470 | 2/1965 | Rhoda | 210/416.2 |
| 3,263,811 | 8/1966 | Baker | 210/416.2 |
| 3,502,220 | 3/1970 | Kohlberg | 210/416.1 |
| 4,268,386 | 5/1981 | May | 210/416.2 |
| 4,454,035 | 6/1984 | Stefan | 210/416.2 |
| 4,533,476 | 8/1985 | Watkins | 210/416.2 |
| 4,552,658 | 11/1985 | Adcock | 210/416.2 |

OTHER PUBLICATIONS

Sales brochure of "Hydro-Pak Cartridge Skim Filter", published by Baker Hydro, Inc. of Irvine, Calif.; three pages; author, date, and place of publication unknown.
Price list of Swimming Pool Products; published by Hayward Pool Products, Inc. of Elizabeth, N.J.; cover page plus pp. 20 and 21; author, date, and place of publication unknown.
Advertisement for Doughboy Pool Products; published by Hoffinger Industries, Inc. of Rancho Cucamunga, CA; one page; author, date, and place of publication unknown.

*Primary Examiner*—Ernest G. Therkorn
*Attorney, Agent, or Firm*—Limbach, Limbach & Sutton

[57] ABSTRACT

A combination skimmer and filter apparatus for filtering water drawn from the surface of a water-filled spa is disclosed. The apparatus includes a housing that is attached to a side wall of the spa, a filter positioned within the housing, a strainer basket that is positioned within the housing and above the filter, an access door that is releasably coupled to the housing and that opens for access to the filter and strainer basket, and a weir plate that is pivotably coupled to the top of the access door.

13 Claims, 7 Drawing Figures

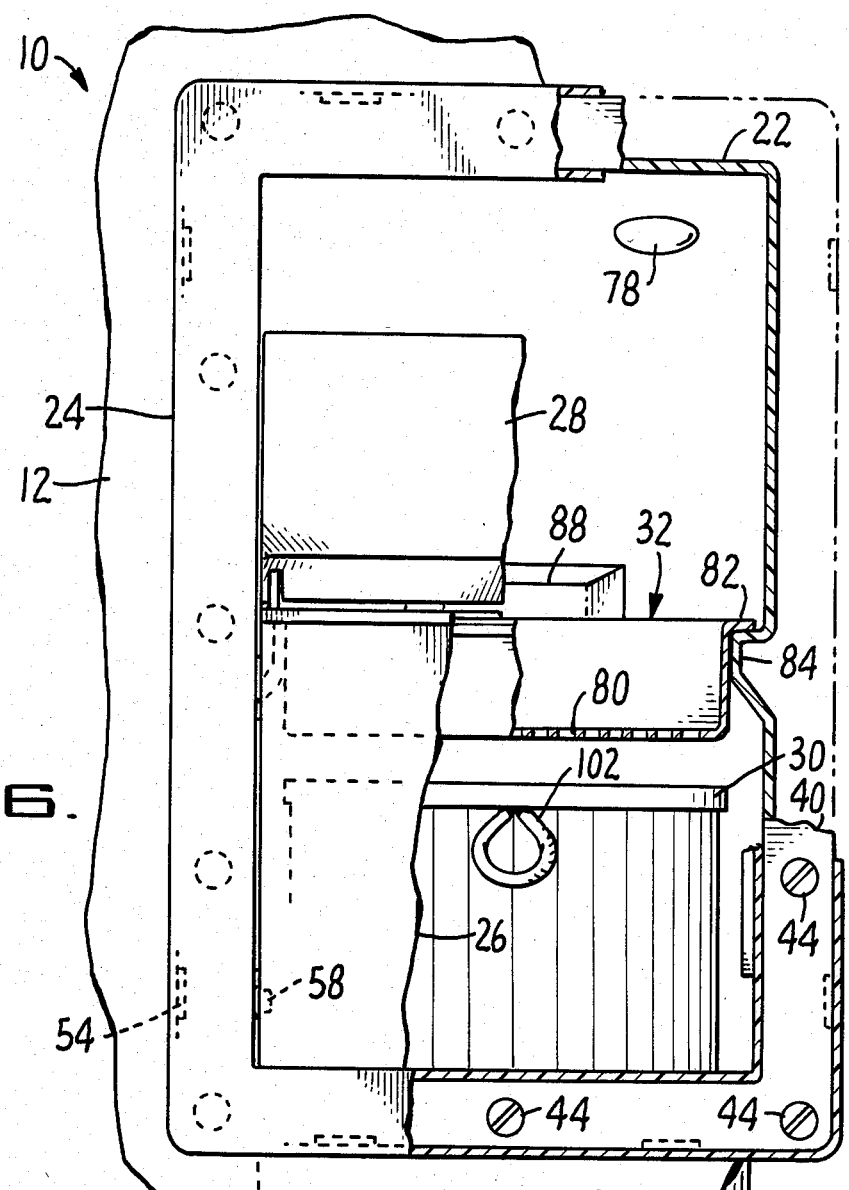
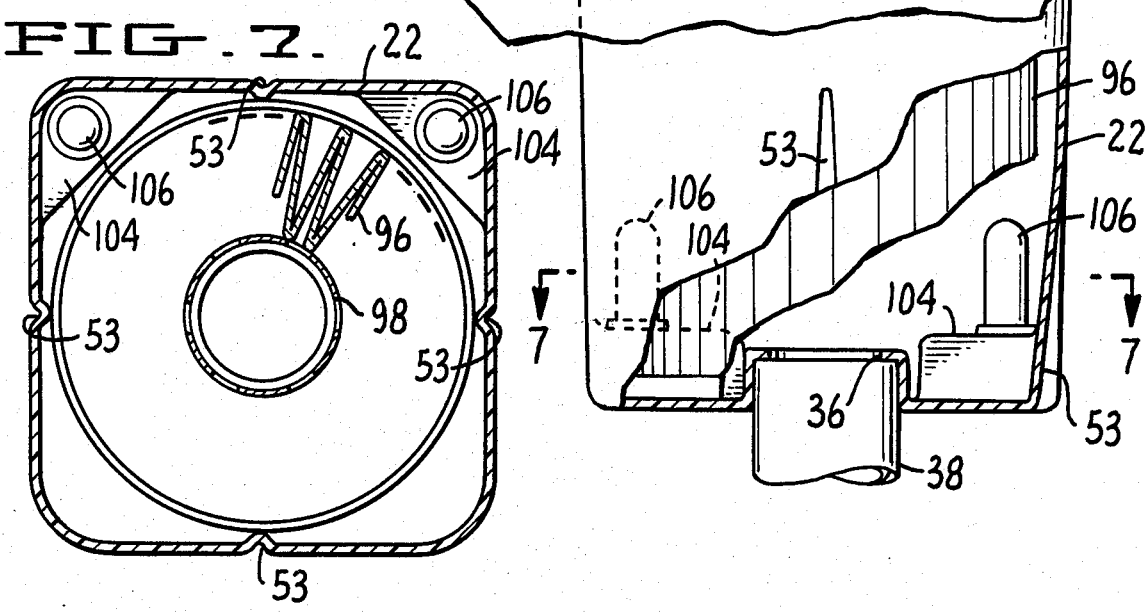

FRONT LOAD SKIMMER/FILTER FOR SPAS AND POOLS

BACKGROUND OF THE INVENTION

1. Field of the Invention

This invention relates generally to water filtration equipment, and relates more particularly to a combination skimmer and filter apparatus with a skimmer that opens to provide access to the filter and strainer.

2. Description of the Relevant Art

In the interests of cleanliness, the water in spas, swimming pools, hot tubs, and other such open tanks of water is periodically or continuously recycled through a filtration system. In a typical spa, water drawn from the surface of the spa by a skimmer is pumped through a filter and is returned to the spa through jets affixed to the spa. Often, water is also drawn into the filtration system through a drain in the bottom of the spa.

In order to eliminate floating matter from the water's surface, a filtration system includes a skimmer device that draws water into the filtration system from the surface of the spa. A skimmer usually includes a weir device that regulates the intake of water into the filtration system. One common skimmer design provides a buoyant weir plate that is pivotably mounted at its lower edge. The water level in the spa is higher than the water level within the interior of the skimmer, and as a result, water spills over the weir plate and into the skimmer. The weir plate reaches an equilibrium position whereby the force of the water flowing over the weir plate is balanced by the buoyancy provided by the water within the skimmer. Such a weir plate can pivot to a range of equilibrium positions to accommodate a range of levels of water in the spa.

A filtration system also includes a filter device that traps particulate matter contained in water flowing through the system. One common type of filter is the cartridge filter that is replaceable as a unit. The filtration system is usually supplemented by a strainer, located upstream of the filter, that removes relatively large objects from the water. Periodically, the filter and strainer must be cleaned. This involves removing and replacing the filter, if it is a cartridge type, and removing, cleaning, and reinstalling the strainer.

One way to reduce the cost of water filtration equipment is to combine the skimmer, strainer, and filter devices into a single unit. Such equipment is available through suppliers such as Baker Hydro, Inc. fo Irvine, Calif. and Hayward Pool Products, Inc. of Elizabeth, N.J. The Baker and Hayward devices include a flanged extension that houses the skimmer and provides means for attaching the device to a side wall of the spa. Water drawn into the skimmer flows horizontally through the extension and then into a vertically oriented cylindrical chamber that contains the strainer and the filter. After flowing downward through the strainer and filter, and the water exits the device through a drain in the bottom of the chamber, then flows through a pump and back into the spa. Access for servicing the strainer and filter is provided through a cover plate located at the top of the cylindrical chamber. The cover plate is intended to be mounted flush with the deck surrounding the spa.

One major drawback to such prior art combination skimmer/filter devices are the costs, both monetarily and aesthetically, of providing a flat deck surrounding the spa. While most outdoor spas are installed with surrounding decks, indoor spas are often installed without such a deck. Even if there is a deck, the spa owner may not want an unsightly cover plate next to the spa. Another drawback is the difficulty in servicing the filter in such prior art combination skimmer/filter devices. Service personnel must first remove the cover plate, then reach far below the deck surface to grasp and remove the strainer, and then reach even farther to grasp and remove the filter.

SUMMARY OF THE INVENTION

In accordance with the illustrated preferred embodiment, the present invention provides a combination skimmer and filter apparatus for filtering water drawn from the surface of a water-filled spa, swimming pool, hot tub, or other open tank of water. The apparatus includes four main components: (1) a housing; (2) a filter; (3) an access door; and (4) a weir plate. The housing is attached to a side wall of the spa, and provides an opening at the water surface through which water to be filtered enters the housing, and provides a drain through which filtered water exits the housing. The filter resides within the housing between the opening and the drain, and acts to filter the water flowing through the housing. The access door is releasably coupled to the housing and is moveable between a closed position that covers an underwater portion of the opening during filtering operation of the apparatus and an open position that uncovers the opening to provide access for the installation and removal of the filter. The weir plate is pivotably coupled to the top of the access door and regulates the flow of water entering the housing.

A fifth main component is a strainer basket that is disposed within and supported by the housing and positioned above the filter so that water entering the housing flows through the strainer basket prior to entering the filter. The strainer basket is removable from the housing through the opening when the access door is at the open position.

The combination skimmer and filter apparatus of the present invention is a significant improvement over other such apparatus in that access to the strainer and filter for maintenance is provided from the inside of the spa through the opening to the housing, rather than through a separate deck plate. The design of the skimmer/filter apparatus of the present invention reduces the costs of materials and assembly as compared to other such apparatus, and also reduces the cost of installation due to the elimination of the separate access.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter. In particular, the use of the term spa is meant to include and encompass all equivalent terms for an open tank of water such as swimming pool, tub, and hot tub, whether or not intended for bathing purposes.

BRIEF DESCRIPTION OF THE DRAWINGS

FIG. 6 is a front elevation view, partially cutaway, of the skimmer/filter of FIG. 1.

FIG. 7 is a top sectional view of the skimmer/filter of FIG. 1 illustrating a cartridge filter, as taken along section line 7—7 of FIG. 6.

DETAILED DESCRIPTION OF THE PREFERRED EMBODIMENT

FIGS. 1 through 7 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
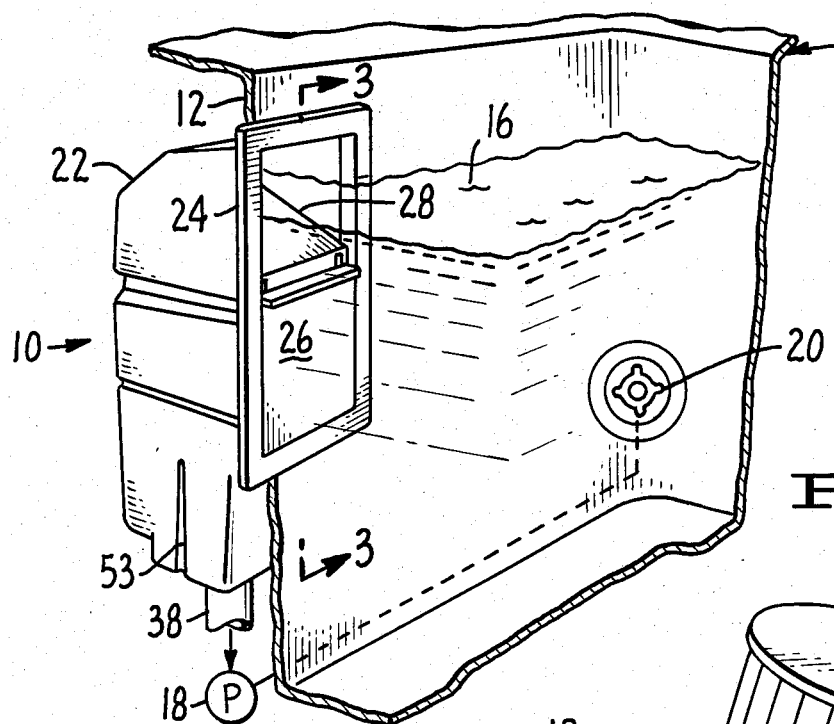
FIG. 1 is a perspective view of a section of a spa illustrating the installation of a combination skimmer and filter apparatus according to the present invention.

The preferred embodiment of the present invention is a combination skimmer and filter apparatus 10 with a skimmer that opens to provide access to the filter and strainer. As shown in FIG. 1, the skimmer/filter 10 is installed in the side wall 12 of a spa 14. Water drawn from the surface 16 of the spa 14 into the skimmer/filter 10 is filtered, and is then pumped through a pump 18 and back into the spa through one or more jets 20.

Figure 2:
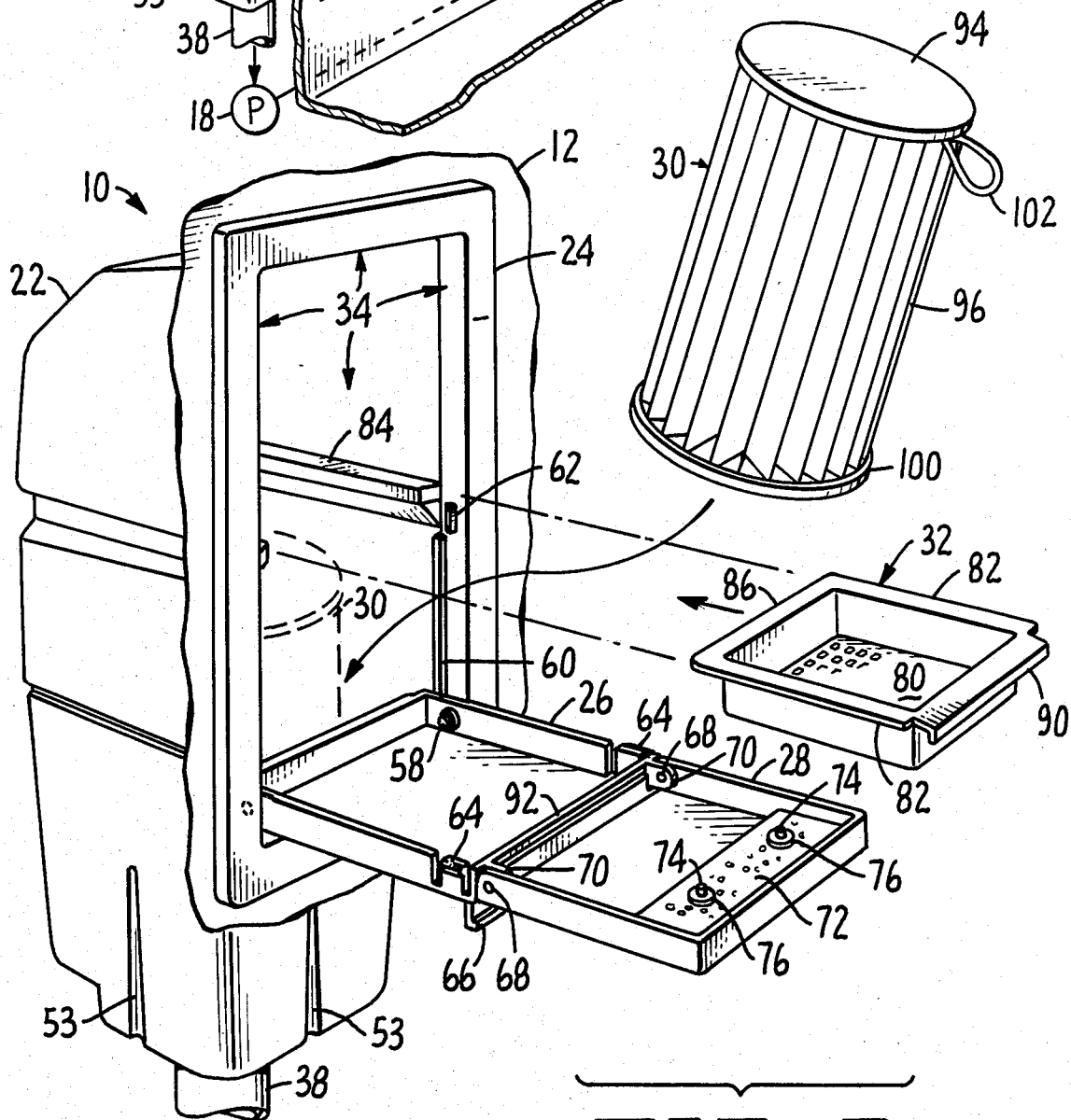
FIG. 2 is an exploded perspective view of the skimmer/filter of FIG. 1.
Figure 3:
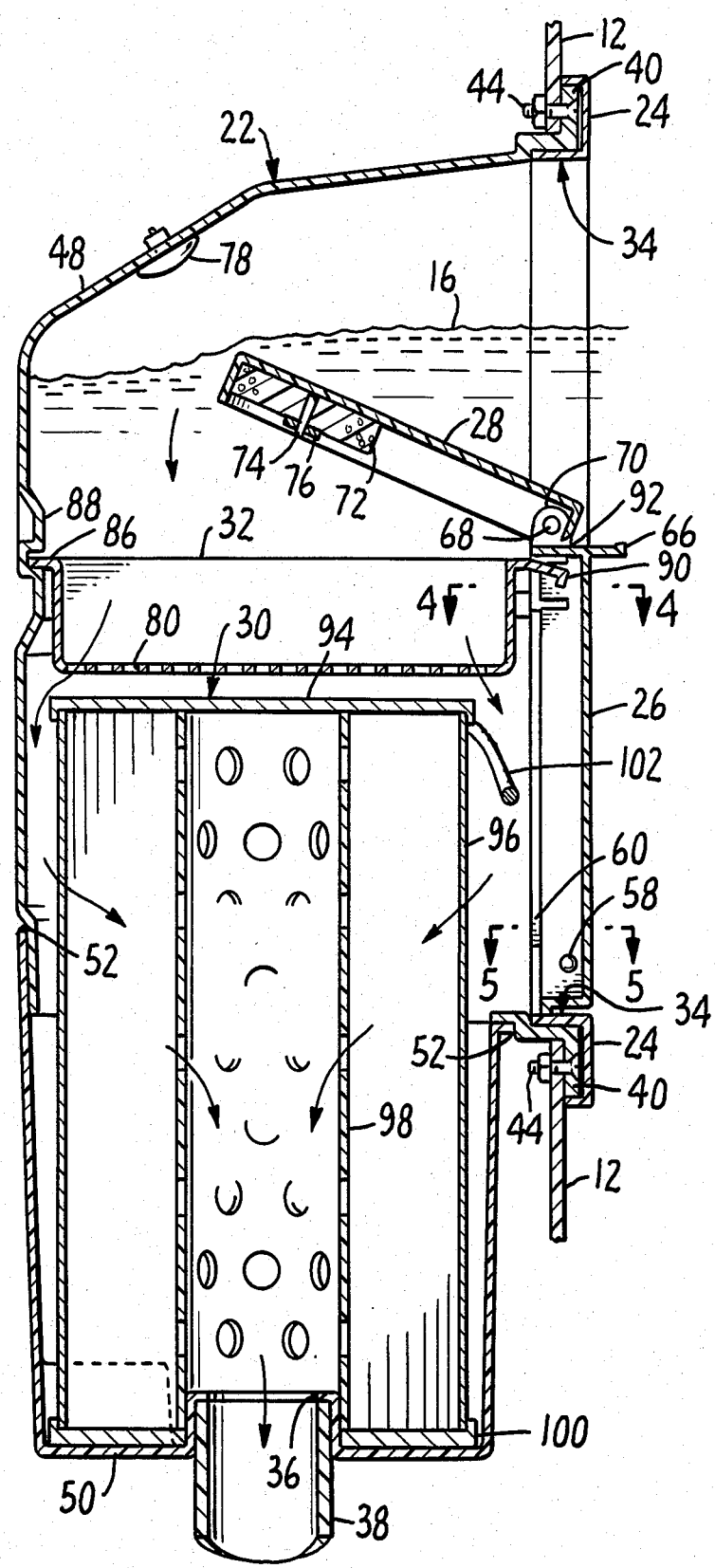
FIG. 3 is a side sectional view of the skimmer/filter of FIG. 1, as taken along section line 3—3 of FIG. 1.

FIGS. 2 and 3 show the individual components of the skimmer/filter 10: a housing 22, a frame 24, an access door 26, a weir plate 28, a filter 30, and a strainer basket 32.

Functionally, the housing 22 provides a flow path for the water drawn from the spa 14, and provides means for mounting the skimmer and filter devices. The housing 22 is attached to the side of the spa 14, with the bulk of the housing located externally to the spa. At the point of attachment to the spa 14, the housing 22 defines a rectangular opening 34 that forms a passageway between the spa and the interior of the housing. Water entering the housing 22 through the opening 34 flows downward through the strainer basket 32 and the filter 30, and exits the housing through a drain 36 located at the bottom of the housing. A drain pipe 38 connects the drain 36 to the pump 18.

Figure 4:
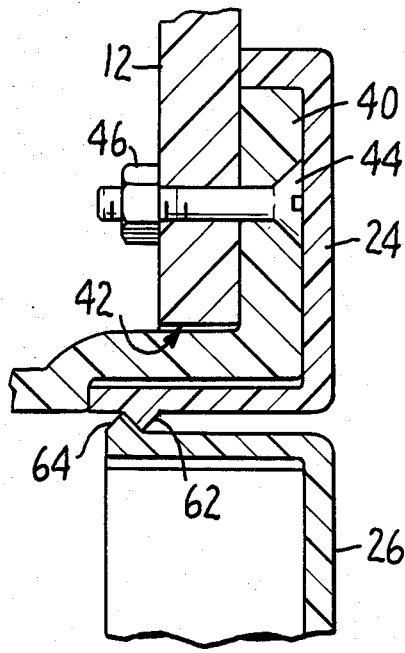
FIG. 4 is a top sectional detail view of a portion of the skimmer/filter of FIG. 1 illustrating a releasable coupling between an access door and a frame, as taken along section line 4—4 of FIG. 3.
Figure 5:
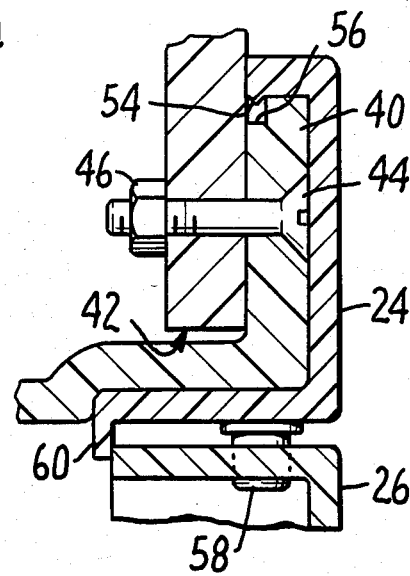
FIG. 5 is a top sectional detail view of a portion of the skimmer/filter of FIG. 1 illustrating a pivotable coupling between the access door and the frame, as taken along section line 5—5 of FIG. 3.

The opening 34 is surrounded by an external flange 40, which provides means for attaching the housing to the side wall 12 of the spa 14. As shown in FIGS. 3, 4, and 5, the flange 40 of the housing 22 is bolted to the inner surface of the side wall 12 of the spa 14, with the housing extending through a hole 42 cut in the side wall. Outwardly projecting countersunk bolts 44 and nuts 46 are used to bolt the flange 40 to the spa 14. This joint is sealed to prevent the seepage of water.

The housing 22 is preferably fabricated from a plastic material such as ABS (acrylonitrile butadiene-styrene) using the process of vacuum forming. The housing is preferably formed in two halves 48 and 50, which are then bonded together to form a water tight joint 52. The upper half 48 of the housing 22 defines the opening 34, while the lower half 50 defines the drain 36. Vertically oriented ribs 53 protrude inwardly from the sides of the lower half 50. The ribs 53 act to align and center the filter 30 within the housing 22.

The frame 24 surrounds the opening 34 and provides a mounting point for the skimmer device, which includes the access door 26 and weir plate 28. The frame 24 has a sectional shape, shown in FIGS. 3, 4, and 5, that surrounds and shields from view the flange 40 and its mounting bolts 44. Included at several locations around the inward facing surface of the outer periphery of the frame 24 are retaining tabs 54 (FIG. 5), each of which fits into a corresponding notch 56 in the flange 40 for mounting the frame 24 to the flange. At a point near the bottom of the frame 24, two studs 58 (one of which is not shown) project inward from opposite sides of the frame. The studs 58 mate with corresponding holes in the access door 26 to provide a pivotable mounting of the access door to the frame. When the access door 26 is at the closed position shown in FIG. 5, a flange 60 on the inner periphery of the frame 24 seals the joint between the access door and the frame.

The access door 26 is pivotably mounted near its lower edge to the frame 24, as described above, which permits the access door to pivot with respect to the fixed frame and housing. In FIG. 2, the access door 26 is shown pivoted downward to an open position to provide access to the interior of the housing 22 for installation and removal of the stainer basket 32 and filter 30. In FIGS. 1 and 3, the access door 26 is shown pivoted upward to a closed position to cover an underwater portion of the opening 34 to force water to flow over the weir plate 28 during filtering operation of the skimmer/filter 10. To retain the access door 26 in the closed position, the frame 24 includes two protrusions 62 (one of which is not shown) that project inwardly from opposite sides of the frame, near the center of the vertical sides of the frame. As best shown in FIG. 4, these protrusions 62 contact corresponding tabs 64 on the access door 26. As shown in FIG. 2, the tabs 64 are relieved from the main body of the access door to facilitate bending movement of the tabs to couple and decouple with the protrusions 62 of the frame 24. The protrusions 62 and tabs 64 form a door catch mechanism, which retains the access door 26 in the closed position, while permitting the access door to be released for movement to the open position. Projecting outward from the top edge of the access door is a handle 66 for grasping and pulling to release the access door from the grip of the door catch mechanism.

The weir plate 28 is pivotably mounted at its lower edge to the upper edge of the access door 26. Located near the lower edge of the weir plate 28 are two holes in the opposite lateral edges of the weir plate. Two pins 68 inserted into the holes in the weir plate 28 pivotably attach the weir plate to two clevises 70 that project upward from the top edge of the access door 26. The clevises 70 allow the weir plate 28 to pivot inward into the interior of the housing 22 when the access door 26 is at its closed position.

When the access door 26 is closed and the pump 18 is turned on, the weir plate 28 regulates the flow of water from the surface 16 of the spa 14 into the housing 22. As shown in FIGS. 2 and 3, a block 72 of buoyant material is attached to the back side of the weir plate 28. The block 72 is placed onto pegs 74 that project from the back side of the weir plate 28, and is retained thereon by retaining rings 76 placed on the protruding tips of the pegs. During filtering operation, the weir plate reaches an equilibrium position, shown in FIG. 3, with the upper edge of the weir plated located just below the water surface, so that water flows over the edge of the weir plate and into the interior of the housing. Since the weir plate 28 can freely pivot within the housing, the equilibrium position is determined by a balance of forces, namely, that the force of the water on the front side of the weir plate is balanced by the force of the water on the back side of the weir plate. The depth of water on the front side of the weir plate is greater than on the back side due to the buoyancy provided by the block 72. Thus, water flows over the top edge of the weir plate 28 and down toward the strainer basket 32 and filter 30.

If during the filtering operation of the spa the weir plate 28 should become stuck in its vertical position, a suction relief valve 78, mounted on the housing 22 and above the water surface, vents air into the interior of the housing to prevent its collapse. The suction relief valve 78 also serves to reduce the vacuum to the pump 18 and causes the pump to lose its prime if an object or person's body should happen to block the flow of water into the housing 22. This is a safety feature that minimizes the potential of injury to a person using the spa.

The strainer basket 32 is positioned within the housing 22, below the weir plate 28 and above the filter 30. The strainer basket 32 is shaped like an open box, with a grid of holes in the bottom 80 for water to flow through, and with flanged sides. The strainer basket 32 retains relatively large objects from the flow of water through the skimmer/filter 10, while allowing relatively small particles to pass through to the filter 30. When the strainer basket 32 is installed within the housing 22, the two lateral flanges 82 are supported by two horizontally extending ribs 84 that protrude inwardly from the side walls of the housing. The rear flange 86 is restrained from upward movement by a lip 88 that protrudes inwardly from the rear wall of the housing. The front flange 90 includes a lip that serves as a handle for grasping and pulling to remove the strainer basket 32 from the housing 22. When the strainer basket 32 is installed within the housing 22 and the access door 26 is closed, the upper edge 92 of the access door restrains the front flange 90 from upward movement. Thus, when installed, the lateral flanges 82 support the weight of the stainer basket 32, while the front and rear flanges 90 and 86 lock the strainer basket in place.

The filter 30 is positioned within the housing 22, between the strainer basket 32 and the drain 36 in the bottom of the housing, as shown in FIGS. 3, 6, and 7. Water flowing through the skimmer/filter 10 is deflected to the sides of the cylindrical filter 30 by the solid top 94. The water flows through the filter media 96 that defines the sides of the filter 30, through a porous core 98 at the center of the filter, downward through the center of the core, and out the drain 36. Preferably, the filter media 96 is disposed in a pleated arrangement. The bottom 100 of the filter 30 has an opening that receives the upper end of the drain pipe 38. A rope tab 102 protrudes from the upper edge of the filter 30, and is used for pulling the filter out of its installed position during filter replacement. Pads 104 in the interior corners at the bottom of the housing 22 provide a surface for the mounting of optional sensing probes 106 adjacent to the installed filter 30. The sensing probes 106 are thus advantageously positioned at the point where water enters the recirculation system, which allows for more accurate sensing of water temperature and quality.

Preferably all of the components of the skimmer/filter 10 except for the filter 30 and the fasteners are fabricated from a plastic material such as ABS (acrylonitrile butadiene-styrene). The housing 22 is preferably vacuum formed, while the frame 24, access door 26, weir plate 28, and strainer basket 32 are preferably molded. The filter 30 is preferably fabricated from a polyester fabric for the pleated filter media 96, a PVC (polyvinyl chloride) pipe for the porous core 98, and a solidified potting compound for the solid top 94 and open bottom 100.

From the above description, it will be apparent that the invention disclosed herein provides a novel and advantageous apparatus for a combination skimmer and filter apparatus with a skimmer that opens to provide access to the filter and strainer.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An apparatus for filtering water drawn from the surface of a water-filled spa, said apparatus comprising:
    a housing affixed to a side wall of the spa, said housing including an opening proximate the water surface through which water enters said housing from the spa, and including a drain through which the water exits said housing;
    a filter disposed within said housing and operable for filtering water flowing through said housing, wherein said filter is removable from said housing through said opening;
    an access door releasably coupled to said housing and moveable between a closed position that covers an underwater portion of said opening during filtering operation of said apparatus and an open position that uncovers said opening to provide access for the installation and removal of said filter; and
    a weir located above said access door and operatively associated with said opening and moveable between a position wherein said weir regulates the flow of water entering said housing and a position that uncovers said opening to provide access for the installation and removal of said filter.

2. An apparatus as recited in claim 1 wherein said weir is coupled to said access door.

3. An apparatus as recited in claim 2 wherein said housing includes a flange surrounding said opening that provides means for affixing said housing to the spa, and wherein said housing further includes a frame coupled to said flange and providing coupling means for releasably coupling said access door to said housing.

4. An apparatus as recited in claim 3 wherein said flange is fastened to and sealed against the inner surface of the side wall of the spa with said housing extending externally from the spa through a clearance hole in the side wall of the spa, and wherein said frame is coupled to said flange proximate the inner surface of the side wall of the spa.

5. An apparatus as recited in claim 3 wherein said frame is rectangular in shape, and wherein said coupling means includes two studs projecting inward from opposite sides of said frame and mating with said access door to provide a pivotable mounting for said access door.

6. An apparatus as recited in claim 5 wherein said coupling means further includes one or more protrusions that project inward to contact and hold said access door at said closed position, and wherein said access door includes a handle that can be pulled to release said access door from contact with said protrusions for movement to said open position.

7. An apparatus as recited in claim 5 wherein said access door is rectangular in shape, wherein said access door is pivotably coupled at a lower edge thereof to said frame, and wherein said weir comprises a rectangular plate pivotably coupled at a lower edge thereof to an upper edge of said access door.

8. An apparatus as recited in claim 7 wherein said weir plate is disposed to pivot inward into said housing, and wherein said weir plate includes buoyant material that adjusts the attitude of said weir plate so that the upper edge of said weir plate is positioned just below the water surface during filtering operation of said apparatus.

9. An apparatus as recited in claim 1 wherein said filter includes a filter cartridge having a cylindrical outer shape with filter media disposed around a central porous core, and wherein during filtering operation water flows radially inward from the outside of said filter, through said filter media, through said central porous core, and into said drain.

10. An apparatus as recited in claim 1 further comprising a strainer basket disposed within and supported by said housing and positioned above said filter so that water entering said housing flows through said strainer basket prior to entering said filter, wherein said strainer basket is removable from said housing through said opening when said access door is at said open position.

11. An apparatus as recited in claim 10 wherein said strainer basket includes flanges extending laterally therefrom, and wherein side flanges of said strainer basket are supported by two horizontally extending ribs that protrude inwardly from the inner surface of said housing.

12. An apparatus as recited in claim 11 wherein a rear flange of said strainer basket is upwardly constrained by a horizontal groove in the inner surface of said housing, and wherein a front flange of said strainer basket is upwardly constrained by a lip on said access door when said access door is at said closed position.

13. An apparatus for filtering water drawn from the surface of a water-filled spa, said apparatus comprising:
a housing affixed to a side wall of the spa, said housing including an opening proximate the water surface through which water enters said housing from the spa, and including a drain through which the water exits said housing;
a frame coupled to said housing and surrounding said opening;
a filter disposed within and supported by said housing and operable for filtering water flowing through said housing, wherein said filter is removable from said housing through said opening;
a strainer basket disposed within and supported by said housing and positioned above said filter so that water entering said housing flows through said strainer basket prior to entering said filter, wherein said strainer basket is removable from said housing through said opening;
an access door releasably coupled to said frame and moveable between a closed position that covers an underwater portion of said opening during filtering operation of said apparatus and an open position that uncovers said opening to provide access for the installation and removal of said filter and said strainer basket; and
a weir plate pivotably coupled to said access door and operable for regulating the flow of water entering said housing, wherein said weir plate is buoyant and operable for seeking a position with the upper edge of said weir plate located just below the water surface so that water flows over said weir plate and into said housing during filtering operation of said apparatus.

* * * * *